3,298,986
PROCESS FOR PREPARING A POLYMER LATEX
Richard Louia Ray, Baton Rouge, La., assignor to Esso Research and Engineering Company, a corporation of Delaware
No Drawing. Filed Dec. 16, 1963, Ser. No. 330,613
8 Claims. (Cl. 260—29.6)

This invention relates to a process for preparing an aqueous dispersion of a rubbery polymer and refers more particularly to an improved butyl rubber latex prepared therefrom.

This application is a continuation-in-part of application, now abandoned, Serial No. 808,929, filed April 27, 1959.

It is known in the art to provide a rubbery solution comprising butyl rubber in a solvent with a boiling point below 100° F., e.g., methyl chloride, ethyl chloride and the like. It is also known to disperse this rubbery solution in water at a temperature between 70° and 100° F. with an emulsifying agent therein (U.S. Patent No. 2,595,797). This dispersion was subsequently stripped at a relatively low temperature, e.g., 70°–100° F., to flash off the solvent with an aqueous rubbery latex resulting therefrom.

In the past, improvements were made in the process which included replacing the previous solvent with one having a higher boiling point, e.g., hexane, and stripping the dispersion at higher temperatures, such as 190° F. However, the process was still not entirely satisfactory since the emulsifier efficiency was relatively poor and the residual emulsifier had a deleterious effect upon the product quality of the resulting dispersion therefrom. Furthermore, the excess emulsifier caused foaming in the dispersion which created a serious handling problem.

It has now been discovered that these aforementioned disadvantages can be overcome by emulsifying the rubbery solution in water at temperatures above 150° F. up to about 260° F. Heretofore it was considered that the higher temperature would cause the polymer to agglomerate and/or coagulate.

Thus, in accordance with one embodiment of this invention, a rubbery solution is prepared comprising butyl rubber dissolved in a solvent with a relatively high boiling point. This solution is then dispersed in water in the presence of an emulsifying agent at a temperature above 150° F., preferably between about 185° and about 200° F. The solvent is subsequently stripped from the emulsion to provide an aqueous latex. This latex can then be concentrated, if desired, by creaming, centrifuging, and/or further stripping.

In the instant invention, the butyl rubber polymer is prepared by reacting 70 to 99.5 parts by weight, preferably 85 to 99.5, of an isoolefin with 30 to 0.5 part by weight, preferably 15 to 0.5, of multiolefin. The isoolefin, in general, is a $C_4$ to $C_7$ compound, e.g., isobutylene or 2-methyl-1-butene. The multiolefin, in general, is a $C_4$ to $C_{10}$ conjugated diolefin, e.g., isoprene, butadiene, or piperylene. The preferred polymer is obtained by reacting 95 to 99.5% by weight of isobutylene with 0.5 to 5% by weight of isoprene. A mixture of monomers, preferably with 1 to 5 volumes of inert diluent, e.g., methyl chloride, should be cooled to a temperature between 0 and −200° C., and it is preferred that the temperature range be between −60° and −130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.15 to 1.0% by weight of the mixed olefins.

The polymerization reaction is rapid and the polymer precipitates out of the solution in the form of a slurry or flocculent white solid. The polymer, which is recovered and dried, has a Staudinger molecular weight between 20,000 and 150,000, preferably 45,000 to 60,000; and an iodine number between 0.5 and 50, preferably between 1 and 15. The preparation of this copolymer is described in U.S. Patent No. 2,356,128. The butyl rubber within the scope of this invention includes those which are halogenated, e.g., chlorinated and brominated; the preferred range of halogen in the rubber structure is from 0.9 to 1.5 weight percent for chlorinated butyl rubber and 1.5 to 3.0 weight percent for brominated butyl rubber. The process for the preparation of suitable halogenated butyl rubbers is fully disclosed in U.S. Patent No. 2,944,578, July 12, 1960.

Although butyl rubber is most applicable, it is also within the purview of this invention to use other highly polymerized water-insoluble substances such as: polyisobutylene, natural rubber, copolymers of isobutylene and styrene, copolymers of butadiene with styrene, and copolymers of butadiene with acrylonitrile.

The rubbery polymer, such as butyl rubber, is dissolved in a hydrocarbon solvent, preferably a $C_5$ to $C_{12}$ aliphatic hydrocarbon with a boiling point above 32° F. The especially preferred solvent is hexane which is generally employed within the range of 100 to 600 parts per 100 parts of rubber by weight (phr.).

This hydrocarbon solution is then emulsified in the presence of water which comprises an emulsifying agent and stabilizer. To perform this emulsification, mechanical work must be supplied to break the hexane solution into colloidal particles. Machines, which are commonly used, include high speed stirrers, such as a dispersator; high shear producing machines, such as colloid mills; and high pressure homogenizers and shear producers, such as the Rapisonic and Minisonic homogenizers. Emulsifying agents (surface active agents) found suitable for the improved process of the present invention are any of those disclosed in Industrial & Engineering Chemistry for January 1939, pages 66–69; January 1941, pages 16–22; January 1943, pages 126–130, and any modifications thereof. Preferred emulsifiers are alkali metal, alkaline earth, ammonium or amine salts of organic sulfates having about 8 to 14 carbon atoms, and preferably about 10 to 14 carbon atoms.

Emulsifiers of the conventionally available and used non-ionic or anionic types are preferred but the successful production of latices of the rubbery polymers herein defined can be carried out using any surface active agent conventionally available and customarily employed as an emulsifying agent. Those specifically set forth in the Industrial & Engineering Chemistry article, supra, are such emulsifying agents that may be used. Suitable examples are the ammonium, sodium, potassium, and other alkali metal or alkaline earth metal salts of sulfated alkyl (nonyl) phenoxyethoxy ethanol, sulfonated castor oil, sulfated or sulfonated hydrolyzed tall oil, tallow, palm oil, oiticica oil, coconut oil, the poly alkoxylated fatty acids (using 5 to 20 mols of ethylene oxide or propylene oxide per mole of fatty acid, for example), etc. Sodium lauryl sulfate and sodium dodecyl benzene sulfonate are typical examples of suitable anionic emulsifiers while the ethylene oxide derivatives of nonyl phenol are good examples of suitable non-ionic emulsifiers. Mixtures of any of the anionic emulsifiers with any of the non-ionic emulsifiers are also useful in carrying out the instant novel process.

Emulsifiers having 12 to 14 carbon atoms are especially desirable; and generally they are aliphatic and saturated, although unsaturated aliphatic and cyclic derivatives may be used. These emulsifiers are employed in amounts ranging from about 1 to about 6 parts phr., preferably between about 1.5 and about 5.0 parts phr. Furthermore, the use of relatively small quantities of a hydrogen orthophosphate salt increases the mechanical and processing stability of these emulsions. It has been found that about 0.25 to about 2 parts of the phosphate phr. are suitable for the production of these highly stabilized emulsions, but it is preferred to use about 0.5 to about 1.5 phr. of the stabilizer.

This emulsifying system generally comprises 30 to 200 parts of water per 100 parts of rubber. As previously stated, it is a prerequisite for the success of this invention to emulsify in the dispersator vessel at a temperature of between about 150° F. and about 260° F., preferably between about 185° F. and about 200° F. Pressure within the range of between about 1 and about 10 atm. can be advantageously employed. Sufficient pressure within this range is applied to the emulsifying admixture to maintain liquid phase during the emulsification.

It is necessary to correlate the amount of emulsifier employed with the temperature maintained for the liquid admixture during the emulsification. As before set forth, it is an object of the invention to obtain an efficient emulsification and dispersion of the rubber component in the liquid components yet at the same time the dispersed particles must be preserved in their dispersed state not only upon completion of emulsification but during the subsequent removal of the aliphatic hydrocarbon rubber solvent and most especially and desirably after the latex is formed, removed from the system, and stored for future use. The coalescing of previously dispersed rubber particles, sometimes stated to be a coagulation, is undesirable and is to be avoided. Such an occurrence results in rubber loss and is to be avoided. In order to avoid or at least minimize such coagulation or coalescence, the use of 1 part of emulsifier per 100 parts of rubber calls for the use of a temperature of about 260° F. and the use of 6 parts of emulsifier per 100 parts of rubber requires a temperature of about 150° F. Similarly a temperature of about 200 to 205° F. would call for the use of about 3.5 parts of emulsifier phr. The general correlation is thus expressed in terms of using between about 1 and about 6 parts of emulsifier phr. while maintaining a temperature between about 260 and about 150° F. respectively. To minimize coagulation preferably between about 2.0 and about 5.0 parts of emulsifier phr. are used while maintaining a preferred temperature of between about 200 and about 185° F., respectively. Typical specific and exemplary correlations are as follows: about 3.7 parts of emulsifier at 200° F., about 4.0 parts of emulsifier at 185° F., about 5.0 to 6.0 parts of emulsifier at 150° F., and about 1.0 to 2.0 parts of emulsifier at 260° F. Larger amounts of emulsifier then above indicated, for any specifically stated temperature, could be used but they would be unnecessary for accomplishing a minimum of coagulation.

The stripping operation may be carried out at elevated temperatures and at atmospheric pressure until all the solvent has been removed. If a high-solids latex is desired, water may be removed by vacuum stripping. If foaming still occurs during this stripping operation, the latex can be diluted with a stripped or partly stripped latex, or in other cases, with an anti-foaming agent, such as Dow Antifoam A emulsion, a polysilicone oil, which may be added just prior to the removal of the solvent. If required, the anti-foaming agent comprises 0.01 to 0.2 part per 100 parts of water by weight.

Thus in accordance with this invention, it is now possible to obtain a latex with excellent product quality with a 25% reduction in the emulsifying agent. Furthermore, the handling problem is alleviated with the substantial decrease in foaming. This new end product has a rubber loss percentage of less than 10 and generally is between 3 and 8%. Rubber loss as defined in the present invention is the total amount of oiling out and/or coagulum expressed in total amount of excess rubber which is not emulsified per total amount of rubber in the feed. Furthermore the latex can now be utilized in applications where high quality surfaces are necessary such as in paint formulations, dipped goods, and coated papers and/or fabrics. These applications could not be utilized previously because of poor surface conditions of the resulting films, e.g., eyeholes, surface imperfections, because of too high a concentration of emulsifier being present in the latex.

The following example is submitted to illustrate but not to limit this invention:

EXAMPLE 1

A rubbery solution was prepared with 23 parts of the copolymer of 97–99% isobutylene with 1–3% isoprene in 77 parts of n-hexane as the solvent. Aqueous solutions are formed comprising water and various amounts of Alipal CO–433 (sodium salt of the sulfate ester of the condensation product of nonyl phenol with polyoxyethylene ethanol containing 4–6 ethylene oxide molecules) as the emulsifying agent and 1.0 part of $NaH_2PO_4$ as the stabilizer to prevent coagulation upon freezing.

Into the dispersator (an autoclave closed to the atmosphere) was introduced 70 parts of rubbery solution (cement) and 30 parts of the aqueous solution. Several runs were performed at various temperatures and under autogenous pressure. The results are indicated in Table I. The emulsion formed in the dispersator at atmospheric pressure was transferred to the Rapisonic homogenizer and was further converted to a fine emulsion by the sonic cavitation produced by the reed in the Rapisonic. The emulsion was recycled for about 3 minutes before it was withdrawn from the homogenizer and stripped of the hydrocarbon solvent.

TABLE I

| Run No. | Emulsifier Content, phr. | Emulsifier Reduction, Percent | Temp., °F. | Wt. Percent Coagulation (Before Rapisonic) | Oiled Out, Percent [1] | Percent Total Rubber Lost |
|---|---|---|---|---|---|---|
| 1 | 5 | 0 | 180 | 3.1 | 0 | 3.1 |
| 2 | 4.5 | 10 | 200 | 3.3 | 0 | 3.3 |
| 3 | 4.0 | 20 | 198±5 | 2.0 | 2.0 | 4.0 |
| 4 | 4.0 (control for Run 3) | 20 | Room temp., 195. | 8.3 | 6.4 | 14.7 |
| 5 | 3.75 | 25 | | 3.9 | 4.0 | 7.9 |
| 6 | 3.75 (control for Run 5) | 25 | Room temp. | 14.5 | 20 | 36.5 |

[1] Determined on 2-liter sample after settling four hours.

This example demonstrates that high quality latex can be obtained with up to 25% emulsifier reduction with a minimum of rubber lost to coagulum or oiling out. Maximum tolerable losses of rubber emulsion from the latex is approximately 10%. Larger amounts of coagulum and/or oiling out seriously distract from the high quality surfaces needed for end use applications mentioned heretofore.

Having set forth the general nature and embodiments of the present invention, the true scope is particularly pointed out in the appended claims.

What is claimed is:

1. A process of producing an improved aqueous latex which comprises dissolving a rubbery polymer selected from the group consisting of a butyl rubber copolymer of an isoolefin with a multiolefin, polyisobutylene, natural rubber, a copolymer of isobutylene with styrene, a copolymer of butadiene with styrene, and a copolymer of butadiene with acrylonitrile in a $C_5$ to $C_{12}$ aliphatic hydrocarbon solvent having a boiling point above 32° F.; emulsifying the resultant rubbery solution with an aqueous solution comprising between about 30 and about 200 parts of water per 100 parts of rubber and between about 1 and about 6 parts of an emulsifier per 100 parts of rubber at a temperature between about 260° F. and about 150° F. respectively, and correlating the amount of emulsifier with the temperature so that a temperature of 260° F. is maintained when 1 part of emulsifier is used and a temperature of 150° F. is maintained when 6 parts of emulsifier are used while maintaining a pressure on the admixture sufficient to maintain liquid phase emulsification and being between about 1 and about 10 atmospheres and stripping the aliphatic hydrocarbon from said dispersion to provide an improved aqueous latex therefrom.

2. The process according to claim 1 in which the rubbery polymer is a butyl rubber copolymer of an isoolefin with a multiolefin.

3. The process according to claim 1 in which the solvent is n-hexane.

4. The process according to claim 1 in which the emulsion temperature is between about 200° and about 185° F. respectively.

5. A process of producing an improved aqueous latex which comprises dissolving a butyl rubber copolymer of an isoolefin with a multiolefin in n-hexane as a solvent; emulsifying the resultant rubbery solution with an aqueous solution comprising between about 30 and about 200 parts of water per 100 parts of rubber and between about 2 and about 5.0 parts of emulsifier per 100 parts of said rubber at a temperature between about 200° and about 185° F. respectively and correlating the amount of emulsifier with the temperature so that a temperature of 200° F. is maintained when 2 parts of emulsifier are used and a temperature of 185° F. when 5.0 parts of emulsifier are used under an autogenous pressure of between about 2.0 and about 1.5 atmospheres respectively, and stripping the n-hexane from said dispersion to provide an improved aqueous latex therefrom.

6. An improved aqueous latex having been prepared by dissolving a rubbery polymer selected from the group consisting of a butyl rubber copolymer of an isoolefin with a multiolefin, polyisobutylene, natural rubber, a copolymer of isobutylene with styrene, a copolymer of butadiene with styrene and a copolymer of butadiene with acrylonitrile in a $C_5$ to $C_{12}$ aliphatic hydrocarbon solvent having a boiling point above 32° F.; emulsifying the resultant rubbery solution with an aqueous solution comprising between about 30 and about 200 parts of water per 100 parts of rubber and between about 1 and about 6 parts of an emulsifier per 100 parts of rubber at a temperature between about 260° F. and about 150° F. respectively, and correlating the amount of emulsifier with the temperature so that a temperature of 260° F. is maintained when 1 part of emulsifier is used and a temperature of 150° F. is maintained when 6 parts of emulsifier are used while maintaining a pressure on the admixture sufficient to maintain liquid phase emulsification and being between about 1 and about 10 atmospheres; and stripping the aliphatic hydrocarbon from said dispersion to provide an improved aqueous latex therefrom.

7. The latex according to claim 6 in which the rubbery polymer is a butyl rubber copolymer of an isoolefin with a multiolefin.

8. An improved aqueous latex having been prepared by dissolving a butyl rubber copolymer of an isoolefin with a multiolefin in n-hexane as a solvent, emulsifying the resultant rubbery solution with an aqueous solution comprising between about 30 and about 200 parts of water per 100 parts of rubber and between about 1 and about 6 parts of emulsifier per 100 parts of said rubber at a temperature between about 200° F. and about 185° F., respectively and correlating the amount of emulsifier with the temperature so that a temperature of 260° F. is maintained when one part of emulsifier is used and a temperature of 150° F. is maintained when six parts of emulsifier are used; under an autogenous pressure of between about 2.0 and about 1.5 atmospheres, respectively; and stripping the n-hexane from said dispersion to provide an improved aqueous latex therefrom.

References Cited by the Examiner

UNITED STATES PATENTS

| 2,313,144 | 3/1943 | Gomm | 260—29.6 |
| 2,595,797 | 5/1952 | Leyonmark et al. | 260—34.2 |
| 2,799,662 | 7/1957 | Ernst et al. | 260—29.7 |
| 2,917,495 | 12/1959 | Cobb et al. | 260—29.7 |

MURRAY TILLMAN, *Primary Examiner.*

J. ZIEGLER, *Assistant Examiner.*